(12) United States Patent
Zhao et al.

(10) Patent No.: US 11,856,277 B2
(45) Date of Patent: Dec. 26, 2023

(54) METHOD AND APPARATUS FOR PROCESSING VIDEO, ELECTRONIC DEVICE, MEDIUM AND PRODUCT

(71) Applicant: Beijing Baidu Netcom Science and Technology Co., Ltd., Beijing (CN)

(72) Inventors: Xiangming Zhao, Beijing (CN); Fei Li, Beijing (CN); Ting Yun, Beijing (CN); Guoqing Chen, Beijing (CN); Saiqun Lin, Beijing (CN); Lin Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/347,290

(22) Filed: Jun. 14, 2021

(65) Prior Publication Data

US 2021/0303864 A1   Sep. 30, 2021

(30) Foreign Application Priority Data

Dec. 17, 2020   (CN) .......................... 202011496732.6

(51) Int. Cl.
*H04N 21/8549*   (2011.01)
*G06V 20/40*   (2022.01)
(Continued)

(52) U.S. Cl.
CPC ......... *H04N 21/8549* (2013.01); *G06V 20/00* (2022.01); *G06V 20/41* (2022.01); *G06V 40/172* (2022.01); *G06V 40/20* (2022.01)

(58) Field of Classification Search
CPC ...... G06V 20/00; G06V 20/41; G06V 40/172; G06V 40/20; H04N 21/23418; H04N 21/44008; H04N 21/4884; H04N 21/8549
See application file for complete search history.

(56) References Cited

U.S. PATENT DOCUMENTS

| | | |
|---|---|---|
| 2006/0257048 A1 | 11/2006 | Lin et al. |
| 2011/0047163 A1 | 2/2011 | Chechik et al. |

(Continued)

FOREIGN PATENT DOCUMENTS

| | | |
|---|---|---|
| CN | 109145784 A | 1/2019 |
| CN | 109977839 A | 7/2019 |

(Continued)

OTHER PUBLICATIONS

Gong et al, "Video summarization and retrieval using singular value decomposition", 2003 (Year: 2003).*

(Continued)

*Primary Examiner* — Ruiping Li
(74) *Attorney, Agent, or Firm* — Seed IP Law Group LLP

(57) ABSTRACT

A method, apparatus, and electronic device for processing a video, a medium and a product are presented. An implementation of the method includes: acquiring a target video; selecting, from at least one preset model, a preset model as a target model; determining output data of the target model based on the target video and the target model; reselecting, in response to determining that the output data does not meet a condition corresponding to the target model, another preset model as the target model from the at least one preset model until the output data of the target model meets the condition corresponding to the target model; and determining, based on the output data, a dynamic cover from the target video.

16 Claims, 6 Drawing Sheets

(51) Int. Cl.
*G06V 40/20* (2022.01)
*G06V 40/16* (2022.01)
*G06V 20/00* (2022.01)

(56) References Cited

U.S. PATENT DOCUMENTS

2016/0014482 A1* 1/2016 Chen ............... H04N 21/8456
386/241
2016/0358367 A1 12/2016 Metz et al.
2017/0124400 A1 5/2017 Yehezkel Rohekar et al.

FOREIGN PATENT DOCUMENTS

| | | |
|---|---|---|
| CN | 110399848 A | 11/2019 |
| CN | 110909205 A | 3/2020 |
| CN | 111274444 A | 6/2020 |
| CN | 111432282 A | 7/2020 |
| CN | 111491173 A | 8/2020 |
| CN | 111787356 A | 10/2020 |
| CN | 111918130 A | 11/2020 |
| JP | 2000-311180 A | 11/2000 |
| JP | 2010-502085 A | 1/2010 |
| JP | 2013-207530 A | 10/2013 |
| JP | 2020-516107 A | 5/2020 |
| KR | 10-2016-0019106 A | 2/2016 |
| KR | 10-2017-0083645 A | 7/2017 |
| WO | 2020/190112 A1 | 9/2020 |

OTHER PUBLICATIONS

Communication pursuant to Article 94(3) EPC for European Application No. 21179672.7, dated Jul. 25, 2022, 7 pages.
Extended European Search Report for European Application No. 21179672.7, dated Nov. 17, 2021, 7 pages.
Hu et al., "Narrative Collage for Soccer Video Summary," Journal of Signal Processing, vol. 35, No. 11, Nov. 2019, 9 pages.

* cited by examiner

METHOD AND APPARATUS FOR PROCESSING VIDEO, ELECTRONIC DEVICE, MEDIUM AND PRODUCT

CROSS-REFERENCE TO RELATED APPLICATIONS

This application claims priority to Chinese Patent Application No. 202011496732.6, filed with the China National Intellectual Property Administration (CNIPA) on Dec. 17, 2020, the content of which is incorporated herein by reference in its entirety.

TECHNICAL FIELD

The present disclosure relates to the field of computer technology, in particular to the field of artificial intelligence, and more particular to a method, apparatus, and electronic device for processing a video, a medium and a product.

BACKGROUND

At present, with the rapid development of the Internet, Internet users may share a large number of videos on the Internet, resulting in more and more online video resources.

SUMMARY

A method, apparatus, and electronic device for processing a video, a medium and a product are provided.

According to a first aspect, some embodiments of the present disclosure provide a method for processing a video, the method includes: acquiring a target video; selecting, from at least one preset model, a preset model as a target model; determining output data of the target model based on the target video and the target model; reselecting, in response to determining that the output data does not meet a condition corresponding to the target model, another preset model as the target model from the at least one preset model until the output data of the target model meets the condition corresponding to the target model; and determining, based on the output data, a dynamic cover from the target video.

According to a second aspect, some embodiments of the present disclosure provide an apparatus for processing a video, the apparatus includes: a video acquisition unit, configured to acquire a target video; a model selection unit, configured to select, from at least one preset model, a preset model as a target model; a data determination unit, configured to determine output data of the target model based on the target video and the target model; a condition determination unit, configured to reselect, in response to determining that the output data does not meet a condition corresponding to the target model, another preset model as the target model from the at least one preset model until the output data of the target model meets the condition corresponding to the target model; and a cover determination unit, configured to determine, based on the output data, a dynamic cover from the target video.

According to a third aspect, some embodiments of the present disclosure provide an electronic device for processing a video, the method includes: one or more computing units; and a storage unit, storing one or more programs thereon, the one or more programs, when executed by the one or more computing units, cause the one or more computing units to implement the method according to the first aspect.

According to a fourth aspect, some embodiments of the present disclosure provide a non-transitory computer readable storage medium storing computer instructions, the computer instructions, being used to cause the computer to perform the method according to the first aspect.

According to the fifth aspect, some embodiments of the present disclosure provide a computer program product, comprising a computer program, the computer program, when executed by a computing unit, implements the method according to the first aspect.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand embodiments of the present disclosure, and do not constitute a limitation to the present disclosure, in which.

DETAILED DESCRIPTION OF EMBODIMENTS

The following describes exemplary embodiments of the present disclosure with reference to the accompanying drawings, which include various details of embodiments of the present disclosure to facilitate understanding, and should be regarded as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

It should be noted that embodiments in the present disclosure and the features in embodiments may be combined with each other on a non-conflict basis. Embodiments of the present disclosure will be described below in detail with reference to the accompanying drawings.

Figure 1:
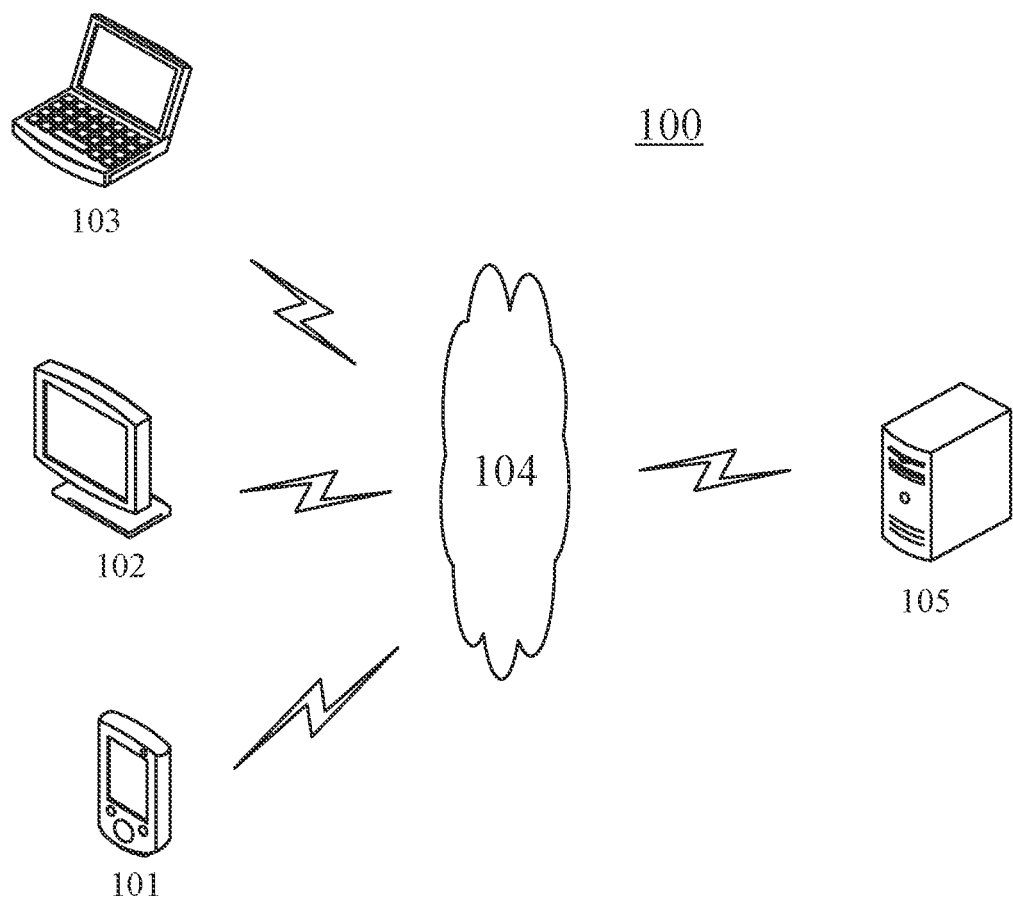
FIG. 1 is an exemplary system architecture diagram to which an embodiment of the present disclosure may be implemented.

FIG. 1 shows an exemplary system architecture 100 to which a method for processing a video or an apparatus for processing a video may be implemented.

As shown in FIG. 1, the system architecture 100 may include terminal device(s) 101, 102, and/or 103, a network 104 and a server 105. The network 104 is used to provide a communication link medium between the device(s) 101, 102, and/or 103 and the server 105. The network 104 may include various types of connections, such as wired, wireless communication links, or optic fibers.

A user may use the terminal device(s) 101, 102, and/or 103 to interact with the server 105 through the network 104 to receive or send messages, and so on. The terminal device(s) 101, 102, and/or 103 may be electronic devices such as televisions, computers, and tablets, and various types of client applications, such as short video entertainment applications, may be installed thereon. The user may run a short video entertainment application using the terminal device(s) 101, 102, and/or 103 to acquire a large number of videos in the application.

The terminal device(s) 101, 102, and/or 103 may be hardware or software. When the terminal device(s) 101, 102, and/or 103 are hardware, they may be various electronic devices, including but not limited to televisions, smart phones, tablet computers, e-book readers, car computers, laptop computers, desktop computers, and so on. When the terminal device(s) 101, 102, and/or 103 are software, they may be installed in the electronic devices listed above. They may be implemented as a plurality of software or software modules (for example, for providing distributed services), or as a single software or software module, which is not limited herein.

The server 105 may be a server that provides various services, such as acquiring videos of short video entertainment applications in the terminal device(s) 101, 102, and/or 103, and may determine a target model from at least one preset model, and then determine a dynamic cover corresponding to each video based on the target model. Further, the server 105 may also transmit the dynamic cover corresponding to each video to the terminal device(s) 101, 102, and/or 103 through the network 104. When the user browses the videos in the short video entertainment applications in the terminal device(s) 101, 102, and/or 103, if a video card is loaded, the dynamic cover corresponding to the video is displayed, so that the user may learn video information of the video based on the dynamic cover, which improves an efficiency of information acquisition.

It should be noted that the server 105 may be hardware or software. When the server 105 is hardware, it may be implemented as a distributed server cluster composed of a plurality of servers, or as a single server. When the server 105 is software, it may be implemented as a plurality of software or software modules (for example, for providing distributed services), or may be implemented as a single software or software module, which is no limited herein.

It should be noted that the method for processing a video provided by embodiments of the present disclosure may be performed by the server 105, and may also be performed by the terminal device(s) 101, 102, and/or 103. Correspondingly, the apparatus for processing a video may be provided in the server 105, or may be provided in the terminal device(s) 101, 102, and/or 103.

It should be understood that the numbers of terminal devices, networks, and servers in FIG. 1 are merely illustrative. Depending on the implementation needs, there may be any number of terminal devices, networks, and servers.

Figure 2:
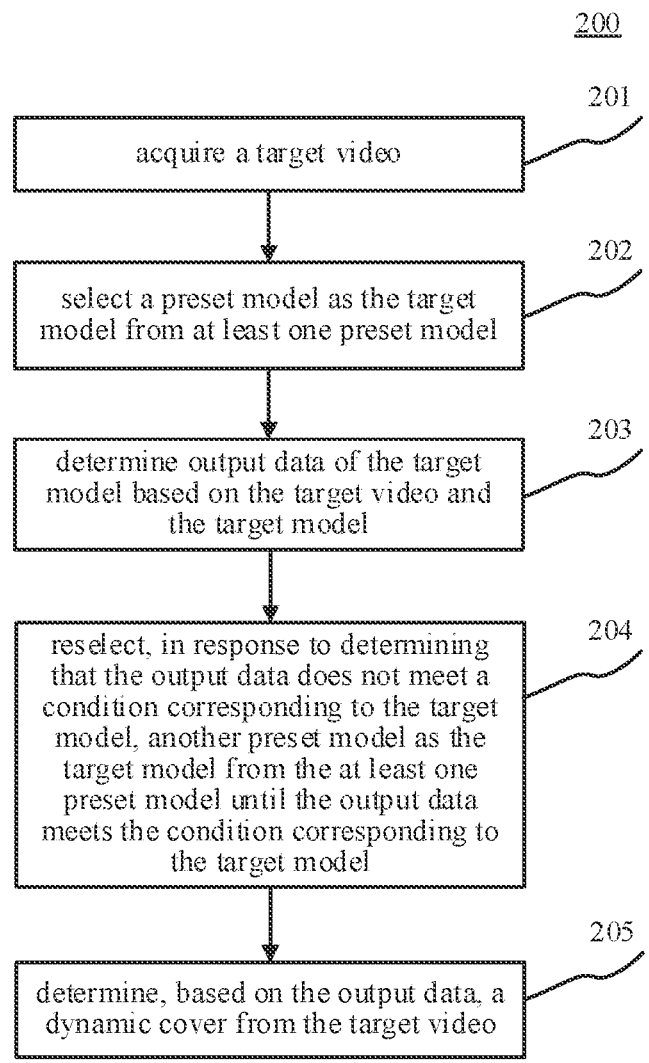
FIG. 2 is a flowchart of a method for processing a video according to an embodiment of the present disclosure.

With further reference to FIG. 2, a flow 200 of a method for processing a video according to an embodiment of the present disclosure is illustrated. The method for processing a video of the present embodiment includes the following steps:

Step 201, acquiring a target video.

In the present embodiment, the target video may be a video in a short video application, a video shared by a user in a social application, or a term definition video in a search application, etc. Source of the target video is not limited in the present embodiment. An executing body (such as the terminal device(s) 101, 102, and/or 103 or the server 105 in FIG. 1) may acquire the target video in these applications through the network. After acquiring the target video, the executing body may choose to download the target video or browse the target video online, which is not limited in the present embodiment.

Step 202, selecting a preset model as the target model from at least one preset model.

In the present embodiment, each of the at least one preset model may be used to process a video to obtain output data that may assist in determining a dynamic cover. The at least one preset model may include, but is not limited to, a face recognition model, a behavior recognition model, a semantic analysis model, a content scoring model, and so on. The face recognition model may be used to recognize a face image in the target video, the behavior recognition model may be used to recognize behavior data in the target video, the semantic analysis model may be used to identity an interpretation of a subtitle in the target video, and the content scoring model may be used to identify an interesting content in the target video and so on. These different video processing models may be models for recognizing the target video in different dimensions, and are capable of meeting various requirements for target video recognition. Further, the executing body determines a preset model as the target model from the at least one preset model, and may determine a preset model as the target model based on a current processing requirement, or may determine a preset model as the target model according to a priority of each preset model. Optionally, the priority of the face recognition model may be set higher than that of the behavior recognition model, and the priority of the behavior recognition model may be set higher than that of the content scoring model.

The determining a preset model as the target model from the at least one preset model, may include: acquiring a video processing category corresponding to the target video; in response to determining that the video processing category is a first category for indicating that the relevance is preferential, determining the model corresponding to the relevance from the at least one preset model as the target model; and in response to determining that the video processing category is a second category for indicating that the interesting level is preferential, determining the model corresponding to the interesting level from the at least one preset model as the target model.

In this implementation, the at least one preset model may include a model corresponding to the relevance and a model corresponding to the interesting level. The model corresponding to the relevance is used to determine whether a video clip is related to the video title and whether a motion in the video is related to a preset motion. The model corresponding to the interesting level is used to determine whether a video clip can represent an entire video and whether there are consecutive video frames inside the video clip. The model corresponding to the relevance may include, but is not limited to, the face recognition model, the behavior recognition model, and the model corresponding to the interesting level may include, but is not limited to, the content scoring model. This process may be based on different cover requirements, such as preferentially selecting a cover of high relevance or preferentially selecting a cover of high quality, and selecting the corresponding target model. For generating a cover, a variety of generation requirements may be met more flexibly.

Step 203, determining output data of the target model based on the target video and the target model.

In the present embodiment, after determining the target model, the executing body may use the target model to perform video processing on the target video to obtain the output data of the target model. The output data of the target model is obtained by analyzing a video feature of the target video. For example, if the target model is the face recognition model, the output data determined based on the target video and the target model may be a matching degree between a face in the target video and a title of the target video; if the target model is the behavior recognition model, the output data determined based on the target video and the target model may be a matching degree between a behavior in the target video and a preset behavior; if the target model is the content scoring model, the output data determined based on the target video and the target model may be content scores corresponding to video frames of the target video; and if the target model is the semantic analysis model, the output data determined based on the target video and the target model may be a matching degree between the subtitle of the target video and the title of the target video, and so on.

Step 204, reselecting, in response to determining that the output data does not meet a condition corresponding to the target model, another preset model as the target model from the at least one preset model until the output data meets the condition corresponding to the target model.

In the present embodiment, each of the at least one model corresponds to a corresponding condition. If the output data of the target model meets the condition corresponding to the target model, the dynamic cover may be determined from the target video based on the output data of the target model. If the output data of the target model does not meet the condition corresponding to the target model, another model may be reselected from the at least one preset model as the target model until the output data of the target model meets the condition corresponding to the target model.

Step 205, determining, based on the output data, a dynamic cover from the target video.

In the present embodiment, the dynamic cover may be a video clip composed of video frames in the target video. For example, when the target model is the face recognition model, the condition corresponding to the face recognition model may be that the face in the target video has a high matching degree with the title of the target video, which indicates that the target video includes a video clip of the face indicated in the title of the target video. In this regard, based on a similarity between the face in the target video and the title of the target video, a video clip showing the face may be selected from the target video as the dynamic cover. Alternatively, when the target model is the behavior recognition model, the condition corresponding to the behavior recognition model may be that the behavior in the target video has a high probability of including a designated motion. In this regard, based on the probability of including the designated motion in the behavior in the target video, a video clip showing the preset behavior may be selected from the target video as the dynamic cover. Alternatively, when the target model is the content scoring model, the condition corresponding to the content scoring model may be that the content score in the target video is high, which indicates that the target video includes interesting content. In this regards, based on the content score corresponding to each video frame in the target video, a video clip having the highest content score may be selected from the target video as the dynamic cover.

Figure 3:
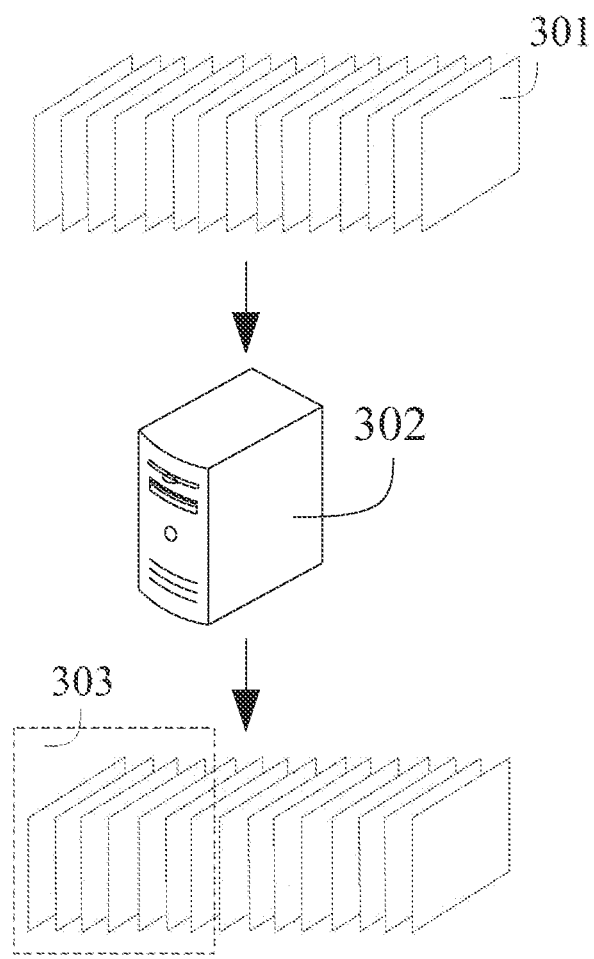
FIG. 3 is a schematic diagram of an application scenario of the method for processing a video according to an embodiment of the present disclosure.

With further reference to FIG. 3, illustrating a schematic diagram of an application scenario of the method for processing a video according to an embodiment of the present disclosure. In the application scenario of FIG. 3, the method for processing a video may be applied to a scenario in which a dynamic cover of a target video is generated. As shown in FIG. 3, a target video 301 for which a dynamic cover is required to be generated includes a number of consecutive video frames. The target video 301 is input into a server 302 so that the server 302 performs the method for processing a video described in the present embodiment, and selects a dynamic cover 303 from the target video 301. The target video 301 may also be input into other electronic device such as a terminal device, so that the electronic device performs the method for processing a video described in the present embodiment, selects a certain number of video frames from the target video 301, and determines the certain number of video frames as the dynamic cover 303. In the case where the target video 301 is pushed to the terminal device for a user to choose to play, the terminal device may display the dynamic cover 303 in a display area where the target video 301 is located if the terminal device determines that the user has located or selected the target video 301. The user may determine whether to watch the complete target video 301 based on a content displayed through the dynamic cover 303. Since the determination of the dynamic cover 303 is based on at least one preset model, a dynamic cover having high accuracy may be determined from the target video based on the target model determined from the at least one preset model and a condition corresponding to the target model, so the user may more accurately estimate the content of the target video 301 based on the dynamic cover, which improves an efficiency of the information acquisition.

The method for processing a video provided by the above embodiment of the present disclosure, by determining a suitable target model from the at least one preset model, and based on the target model and the condition corresponding to the target model, the dynamic cover may be accurately determined from the target video based on the output data of the target model. Based on the at least one model, an accuracy of cover determination is improved.

Figure 4:
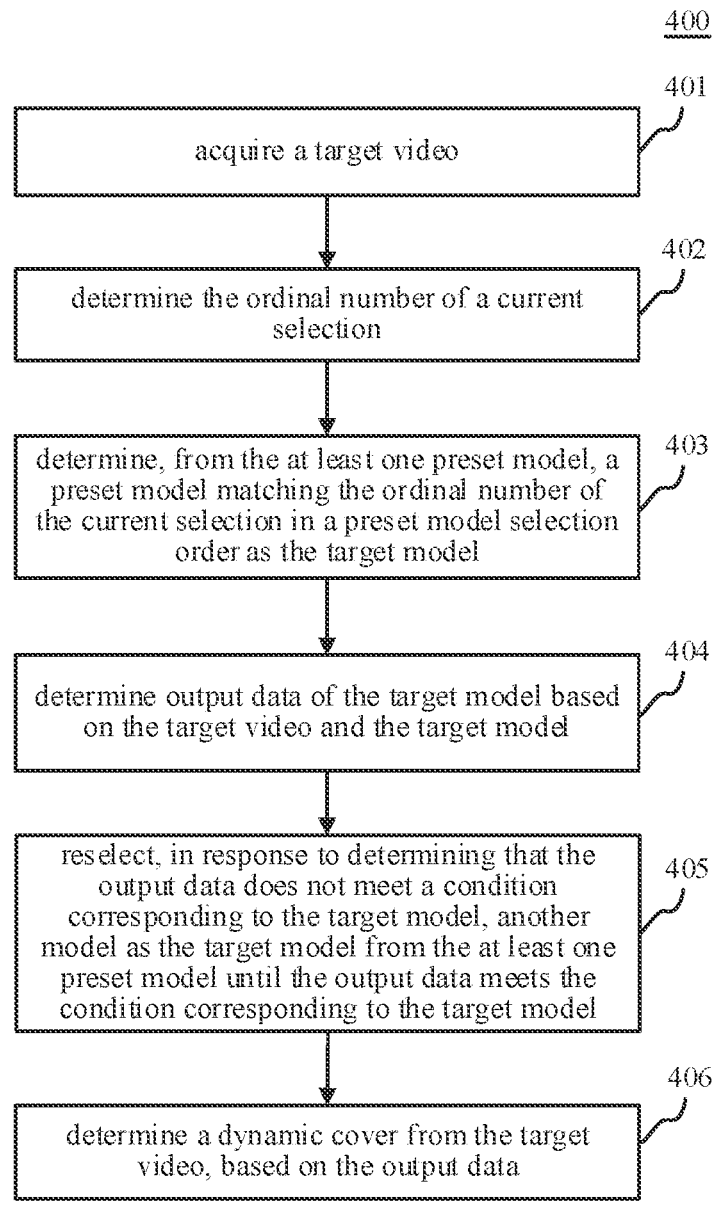
FIG. 4 is a flowchart of a method for processing a video according to another embodiment of the present disclosure.

With further reference to FIG. 4, a flow 400 of a method for processing a video according to another embodiment of the present disclosure is illustrated. As shown in FIG. 4, the method for processing a video of the present embodiment may include the following steps:

Step 401, acquiring a target video.

In the present embodiment, for the detailed description of step 401, reference may be made to the detailed description of step 201, and detailed description thereof will be omitted.

In some alternative implementations of the present embodiment, the acquiring a target video may include: acquiring the target video based on a video address and/or video title.

In this implementation, the video address may refer to an address link of the target video, and the address link is used to locate the location of the target video. The video title may be the title of the target video, and is usually the key information that is capable of reflecting the content of the target video. Based on the video address and/or video title, the target video may be acquired based on a corresponding relationship between the video address and the target video and/or a corresponding relationship between the video title and the target video.

Step 402, determining the ordinal number of a current selection.

Step 403, determining, from the at least one preset model, a preset model matching the ordinal number of the current selection in a preset model selection order as the target model.

In the present embodiment, the selection for the target model may be performed according to a preset selection order, or may be performed based on a model weight of each model in the at least one model, and so on, which is not limited in the present embodiment. The ordinal number of a current selection is used to indicate the ordinal number of selecting a target model, and the ordinal number of the current selection is 1 may indicate that the target model is selected for the first time. Further, the selection order number corresponding to each of the at least one preset model may be determined, and the selection order number may be a preset order number. From the at least one preset model, the target model having a selection order number matches an ordinal number of the current selection may be determined. For example, if the ordinal number of a current selection is 2, and the selection order number corresponding to the second model in the at least one preset model is 2, in this regard, the second model may be determined as the target model.

In some alternative implementations of the present embodiment, the target model may be selected by performing the following steps: determining an initial weight of each model in the at least one preset model, where the initial weight is a preset weight that matches an attribute of the model; and determining, according to the initial weights in descending order, a preset model as the target model from the at least one preset model sequentially. Optionally, after each time the target model is determined, the initial weight may be updated to mark the selected model.

For example, assuming that the at least one preset model includes a first model, a second model, and a third model. There is a first weight corresponding to the first model, a second weight corresponding to the second model, and a third weight corresponding to the third model. Also, a value of the first weight is greater than that of the second weight, and the value of the second weight is greater than that of the third weight. During determining a model as the target model for the first time, the first model may be determined as the target model. After that, the value of the first weight may be reduced by a preset ratio to update the initial weight. During determining a model as the target model for the second time, if the reduced value of the first weight is less than the third weight then, the second model may be determined as the target model during the current selection for the target model.

Step 404, determining output data of the target model based on the target video and the target model.

In the present embodiment, the target model may include any combination of the face recognition model, the behavior recognition model, and the content scoring model. Optionally, the target video may be used as input data of the target model, and the target model may output the output data of the target model corresponding to the target video. For a detailed description of step 404, reference may be made to the detailed description of step 203, and detailed description thereof will be omitted.

In some alternative implementations of the present embodiment, the determining output data of the target model based on the target video and the target model, includes: determining, based on the target video and the face recognition model, a similarity between a face object in the target video and at least one preset face object.

In this implementation, the face recognition model may recognize the face object in each video frame in the target video, and determine the similarity between the face object and at least one preset face object. The at least one preset face object may include at least one face of a celebrity.

Optionally, after the face recognition model recognizes the face object in each video frame in the target video, it may also calculate a ratio of the size of a face part to the total size of the image including the face part. During determining the dynamic cover from the target video based on the output data of the target model, then a video clip corresponding to a video frame, which has the largest ratio of the size of the face part to the total size of the image including the face part, may be determined as the dynamic cover.

In some alternative implementations of the present embodiment, the target video includes a title, and the title includes a name; and the following step may also be performed: in response to determining that the similarity is less than a preset first threshold, or in response to determining that the similarity is greater than or equal to the first threshold but the face object in the target video does not match the name, determining that the output data does not meet the condition corresponding to the target model.

In this implementation, if the similarity between the face image in the target video and the at least one preset face object is greater than or equal to the preset first threshold, it indicates that the celebrity face appears in the target video, and it may be further determined whether the face object matches the name in the video title. By matching the face object in the target video and the name, it may be determined whether the celebrity appearing in the target video is the celebrity indicated in the video title. Based on the similarity and whether the face object in the target video matches the name in the video title, it may be jointly determined whether the output data of the target model meets the condition corresponding to the target model. If the similarity is less than the preset first threshold, or the similarity is greater than or equal to the first threshold but the face object in the target video does not match the name in the video title, it may be determined that the output data does not meet the condition corresponding to the target model.

In some alternative implementations of the present embodiment, the determining output data of the target model based on the target video and the target model, includes: determining, based on the target video and the behavior recognition model, a probability of including a designated motion in behavior information in the target video.

In this implementation, the behavior recognition model is used to recognize the behavior information in the target video, and determine the probability of that the behavior information in the target video includes a designated motion. The behavior recognition model may be an image binary classifier. In a process of training the image binary classifier, a behavior image that includes the designated motion may be determined as a positive sample, and a behavior image that does not include the designated motion may be determined as a negative sample. After inputting the target video into the behavior recognition model, based on a result of calculating forwardly by the behavior recognition model, a probability of that the behavior information in each video frame in the target video includes the designated motion may be obtained. Based on the probability, the output data of the target model may be determined. The designated motion may include, but is not limited to, hugging behavior information, kissing behavior information, and so on.

In some alternative implementations of the present embodiment, the following steps may also be performed: in response to determining that the probability is less than a preset second threshold, determining that the output data does not meet the condition corresponding to the target model.

In this implementation, if the output data of the target model indicates that the probability is less than the preset second threshold, it indicates that a probability of that target video includes the designated motion is low. In this regard, it may be determined that the output data of the target model does not meet the condition corresponding to the behavior recognition model. If the output data of the target model indicates that the probability is greater than or equal to the preset second threshold, it indicates that the probability of the target video including the designated motion is high. In this regard, it may be determined that the output data of the target model meets the condition corresponding to the behavior recognition model.

In some alternative implementations of the present embodiment, the determining output data of the target model based on the target video and the target model, includes: obtaining, for a plurality of video frames in the target video, content scores of the video frames based on the content scoring model.

In this implementation, the content scoring model is a model for scoring the video content in the target video. Inputting the target video into the content scoring model, the content scores of the plurality of video frames in the target video may be obtained from the content scoring model.

In some alternative implementations of the present embodiment, the obtaining, for a plurality of video frames in the target video, content scores of the video frames based on the content scoring model, includes: inputting the plurality of video frames in the target video into the content scoring model, so that the content scoring model determines feature information of the video frames, and determines a difference feature and a similar feature between the video frames based on the feature information of the video frames, and outputs the content scores of the video frames based on the difference feature and the similar feature.

In this implementation, the difference feature between the video frames may reflect different features between the video frames, and the similar feature between the video frames may reflect similar features between the video frames. A video frame that is different from other video frames may be filtered based on the difference feature, and a video frame that can represent the video may be filtered based on the similar feature, so that interesting content may be filtered based on the two parts of difference and representativeness.

In some alternative implementations of the present embodiment, the following step may also be performed: determining, in response to determining that the content scores are less than a preset third threshold, that the output data does not meet the condition corresponding to the target model.

In this implementation, if the content scores are less than the preset third threshold, it indicates that there is no interesting content clip in the target video. In this regard, it may be determined that the output data of the target model does not meet the condition corresponding to the behavior recognition model. If the content scores are greater than or equal to the preset third threshold, it indicates that there is an interesting content clip in the target video. In this regard, it may be determined that the output data of the target model meets the condition corresponding to the behavior recognition model.

In some alternative implementations of the present embodiment, the content scoring model is obtained by training through steps as follows: acquiring sample videos; inputting the sample videos into a content scoring model to be trained, so that the content scoring model to be trained extracts feature information of video frames in the sample videos, determines content scores of the video frames in the sample videos based on the feature information, and determines a sample video clip based on the content scores of the video frames in the sample videos; determining a clip internal parameter and a clip external parameter corresponding to the sample video clip; and training the content scoring model to be trained to obtain the trained content scoring model, based on the clip internal parameter and the clip external parameter.

In this implementation, the content scoring model may be determined and obtained based on CNN (Convolutional Neural Networks), LSTM (Long Short-Term Memory) and reinforcement learning. Optionally, an Auto Encoder-Decoder framework may be used as a coding framework of the content scoring model. An encoder may adopt Resnet (Residual Neural Network), and a decoder may adopt a bidirectional LSTM. In a training stage of the content scoring model, a sample video may be acquired first, and then the sample video is input into the content scoring model to be trained, so that the content scoring model to be trained extracts the feature information of the video frames in the sample video through CNN, and then inputs the feature information of the video frames into LSTM to obtain the content scores of the video frames, where the content score is used to describe a probability of that the content of a video frame is selected as the dynamic cover. Further, Bernoulli sampling may be performed on the sample video based on the content scores to obtain the sample video clip. Then, the clip internal parameter and the clip external parameter corresponding to the sample video clip may be determined. The clip internal parameter is used to describe difference between frames of the video clip, and the clip external parameter is used to describe representativeness of that the video clip can represent the sample video. Based on the clip internal parameter and the clip external parameter, a reward function may be constructed and obtained. Based on the reward function, the content scoring model to be trained may be updated based on fed back, to obtain the trained content scoring model. Here, the reward function is determined and obtained based on the following formula:

$$R(S) = Rdiv + Rrep$$

here, R(S) represents the reward function, Rdiv represents the clip internal parameter, and Rrep represents the clip external parameter.

The clip internal parameter is determined and obtained based on the following formula:

$$Rdiv = \frac{1}{|y|(|y|-1)} \Sigma_{t \in y} \Sigma_{t' \in y} d(x_t, x_{t'})$$

here, y represents a total number of video frames of the video, $x_t$ represents a feature vector of the $t^{th}$ frame in the video, and d represents calculation of cosine similarity.

The clip external parameter is determined and obtained based on the following formula:

$$Rrep = \exp\left(-\frac{1}{T}\sum_{t=1}^{T} \min\|x_t - x_{t'}\|_2\right)$$

here, T represents a duration of the video. It should be noted that when a rate of the video is 1 frame/second, values of T and y are equal. In this circumstance, t represents the $t^{th}$ frame and the $t^{th}$ second.

Step 405, reselecting, in response to determining that the output data does not meet a condition corresponding to the target model, another model as the target model from the at least one preset model until the output data meets the condition corresponding to the target model.

In the present embodiment, for a detailed description of step 405, reference may be made to the detailed description of step 204, and detailed description thereof will be omitted.

Step 406, determining a dynamic cover from the target video, based on the output data.

In the present embodiment, for a detailed description of step 406, reference may be made to the detailed description of step 205, and detailed description thereof will be omitted.

In some alternative implementations of the present embodiment, the determining a dynamic cover from the target video, based on the output data of the target model, includes: determining, based on a preset video clip length, a set of candidate video clips corresponding to the target video; and determining the dynamic cover from the set of candidate video clips based on the output data of the target model.

In this implementation, the preset video clip length may include a duration and the number of frames, for example, the preset video clip length may be 6 seconds or 10 frames, etc. The present embodiment does not limit the specific values of the preset video clip length. The set of candidate video clips corresponding to the target video may be determined based on the preset video clip length. A length of each candidate video clip in the set of candidate video clips is the preset video clip length. A feature vector (the feature vector is a vector acquired during calculating the clip external parameter) of each video frame in the target video may be acquired first, and then based on the feature vector, a candidate video clip including consecutive pictures and can represent the entire video is selected from the set of candidate video clips.

In some alternative implementations of the present embodiment, the determining the dynamic cover from the set of candidate video clips, based on the output data of the target model, includes: determining, based on the output data of the target model, a content score corresponding to each candidate video clip in the set of candidate video clips; and determining the dynamic cover from the set of candidate video clips, based on the content score corresponding to each candidate video clip.

In this implementation, content scores of video frames in each candidate video clip in the set of candidate video clips may be determined based on the output data of the target model of the content scoring model, and the content scores of the video frames are synthesized to obtain the content score of the candidate video clip. Preferably, a candidate video clip having the highest content score may be determined as the dynamic cover.

In some alternative implementations of the present embodiment, the determining output data of the target model based on the target video and the target model, includes: extracting frames evenly from the target video to obtain a set of video frames; and determining the output data of the target model based on the set of video frames and the target model.

In this implementation, frames are evenly extracted from the target video to obtain the set of video frames. The extraction may be performed at intervals of a preset number of frames, or may be performed at intervals of a preset time, which is not limited in the present embodiment. Optionally, frames may be evenly extracted from the target video with reference to the location of a key frame, so that the video frames in the set of video frames can contain the key frame that needs to be used. Further, the video frames in the set of video frames may be input into the target model sequentially to determine the output data of the target model.

In some alternative implementations of the present embodiment, the determining the set of candidate video clips corresponding to the target video based on a preset video clip length, includes: determining, in the target video, a black-bordered video frame in which a video block border occurs; and determining the set of candidate video clips corresponding to the target video, based on other video frames in the target video excluding the black-bordered video frame and the preset video clip length.

In this implementation, a video frame with a video black border in the target video may be detected and determined as the black-bordered video frame, and then the set of candidate video clips may be determined based on the other video frames in the target video excluding the black-bordered video frame and the preset video clip length. In this way, the determined set of candidate video clips do not include a black-bordered video frame, or the number of black-bordered video frames contained therein is small. For the step of detecting a video frame with a video black border in the target video, an existing black border detection technology may be used, and detailed description thereof will be omitted.

In some alternative implementations of the present embodiment, the determining a set of candidate video clips corresponding to the target video, based on a preset video clip length, includes: determining, in the target video, a still video frame in which a still picture occurs; and determining the set of candidate video clips corresponding to the target video, based on other video frames in the target video excluding the still video frame and the preset video clip length.

In this implementation, it may detect, in the target video, a video frame with a still picture, and determine the detected video frame as the still video frame, and then determine the set of candidate video clips based on the other video frames in the target video excluding the still video frame and the preset video clip length. In this way, the determined set of candidate video clips does not include a still video frame, or the number of still video frames contained therein is small. For the step of detecting in the target video a video frame with a still picture, an existing still picture recognition technology may be used, and detailed description thereof will be omitted.

For example, the target video may be acquired based on the video address and/or video title, and then according to the preset selection order, the face recognition model is determined as the target model from the at least one preset model, and then whether there is a face corresponding to the celebrity in the video title in the target video is determined based on the target video and the face recognition model. If in the target video, there is a face corresponding to the celebrity, it is determined that the output data of the target model meets the condition corresponding to the face recognition model, and a video clip including the face corresponding to the celebrity is selected from the target video as the dynamic cover. If in the target video there is no face corresponding to the celebrity, it is determined that the output data of the target model does not meet the condition corresponding to the face recognition model, and then the behavior recognition model is reselected from the at least one model as the target model. Then, based on the target video and the behavior recognition model, whether there is the preset behavior included in the target video is determined. If in the target video there is the preset behavior, it is determined that the output data of the target model meets the condition corresponding to the target model, and a video clip containing the preset behavior is determined as the dynamic cover. If there is no preset behavior in the target video, it is determined that the output data of the target model does not meet the condition corresponding to the target model, and then the content scoring model is reselected from the at least one model as the target model. Based on the target video and content scoring model, the content scores of the video frames of the target video are calculated, and then a clip having the highest content score is selected as the dynamic cover.

It can be seen from FIG. 4 that, compared with the embodiment corresponding to FIG. 2, the flow 400 of the method for processing a video in the present embodiment may also reselect, in response to determining that the output data of the target model does not meet the condition corresponding to the target model, a preset model as the target model, and may re-determine the output data of the target model until the output data of the new target model can meet the condition corresponding to the target model, to determine the dynamic cover from the target video. This process may realize that a plurality of models sequentially determine whether the output data of the target model meets the corresponding condition, and select the output data of the target model of the model that meets the corresponding condition to determine the dynamic cover based thereon, which further improves an accuracy of dynamic cover determination. In addition, the target model may include the face recognition model, the behavior recognition model, and the content scoring model. Using these three models, the relevance feature between the video image with the video title, the behavior feature in the video image, and the interesting level of the video content may be comprehensively considered to obtain the dynamic cover. It can improve the relevance between the dynamic cover and video, as well as the interesting level of the dynamic cover, making an effect of dynamic cover selection better. The content scoring model may be an unsupervised model without label information, which reduces a labeling cost of model training and makes model training more efficient. In addition, technical means such as black border detection, still picture recognition, and scenario segmentation may also be used to determine the candidate video clips, which improves an effectiveness of the dynamic cover.

Figure 5:
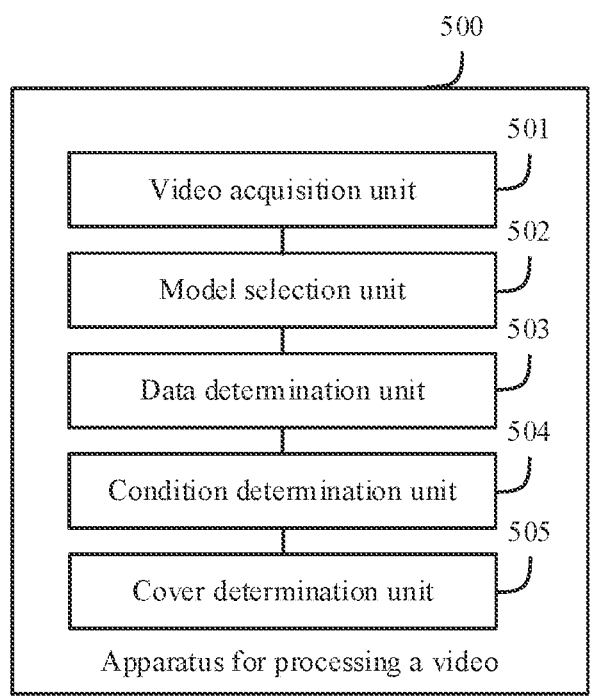
FIG. 5 is a schematic structural diagram of an apparatus for processing a video according to an embodiment of the present disclosure.

With further reference to FIG. 5, as an implementation of the method shown in the above figures, an embodiment of the present disclosure provides an apparatus for processing a video. The apparatus embodiment corresponds to the method embodiment as shown in FIG. 2. The apparatus may be applied to various electronic devices.

As shown in FIG. 5, an apparatus 500 for processing a video of the present embodiment includes: a video acquisition unit 501, a model selection unit 502, a data determination unit 503, a condition determination unit 504 and a cover determination unit 505.

The video acquisition unit 501 is configured to acquire a target video.

The model selection unit 502 is configured to select, from at least one preset model, a preset model as a target model.

The data determination unit 503 is configured to determine output data of the target model based on the target video and the target model.

The condition determination unit 504 is configured to reselect, in response to determining that the output data does not meet a condition corresponding to the target model, another preset model as the target model from the at least one preset model until the output data of the target model meets the condition corresponding to the target model.

The cover determination unit 505 is configured to determine, based on the output data, a dynamic cover from the target video.

In some alternative implementations of the present embodiment, the target model is selected through steps as follows: determining an ordinal number of a current selection; and determining, from the at least one preset model, a preset model matching the ordinal number of the current selection in a preset model selection order as the target model.

In some alternative implementations of the present embodiment, the target model includes a face recognition model; and the data determination unit 503 is further configured to: determine, based on the target video and the face recognition model, a similarity between a face object in the target video and at least one preset face object.

In some alternative implementations of the present embodiment, the target video includes a title, and the title includes a name; and the condition determination unit 504 is further configured to: in response to determining that the similarity is less than a preset first threshold, or in response to determining that the similarity is greater than or equal to the first threshold but the face object in the target video does not match the name, determine that the output data does not meet the condition corresponding to the target model.

In some alternative implementations of the present embodiment, the target model includes a behavior recognition model; and the data determination unit 503 is further configured to: determine, based on the target video and the behavior recognition model, a probability of behavior information in the target video including a designated motion.

In some alternative implementations of the present embodiment, the condition determination unit 504 is further configured to: determine, in response to determining that the probability is less than a preset second threshold, that the output data does not meet the condition corresponding to the target model.

In some alternative implementations of the present embodiment, the target model includes a content scoring model; and the data determination unit 503 is further configured to: obtain, for a plurality of video frames in the target video, content scores of the video frames based on the content scoring model.

In some alternative implementations of the present embodiment, the apparatus also includes: a second condition determination unit 504, configured to determine, in response to determining that the output data of the target model indicates that the probability is greater than a preset third threshold, that the output data of the target model meets the condition corresponding to the behavior recognition model.

In some alternative implementations of the present embodiment, the data determination unit 503 is further configured to: input the plurality of video frames in the target video into the content scoring model, so that the content scoring model determines feature information of the video frames, and determines a difference feature and a similar feature between the video frames based on the feature information of the video frames, and outputs the content scores of the video frames based on the difference feature and the similar feature.

In some alternative implementations of the present embodiment, the condition determination unit 504 is further configured to: determine, in response to determining that the content scores are less than a preset third threshold, that the output data does not meet the condition corresponding to the target model.

In some alternative implementations of the present embodiment, the cover determination unit 505 is further configured to: determine, based on a preset video clip length, a set of candidate video clips corresponding to the target video; and determine, based on the output data, the dynamic cover from the set of candidate video clips.

In some alternative implementations of the present embodiment, the cover determination unit 505 is further configured to: determine, based on the output data, a content score corresponding to each candidate video clip in the set of candidate video clips; and determine the dynamic cover from the set of candidate video clips based on the content score corresponding to the each candidate video clip.

In some alternative implementations of the present embodiment, the data determination unit 503 is further configured to: extract frames evenly from the target video to obtain a set of video frames; and determine the output data of the target model based on the set of video frames and the target model.

In some alternative implementations of the present embodiment, the content scoring model is obtained by training through steps as follows: acquiring a sample video; inputting the sample video into a content scoring model to be trained, so that the content scoring model to be trained extracts feature information of video frames in the sample video, determines content scores of the video frames in the sample video based on the feature information, and determines a sample video clip based on the content scores of the video frames in the sample video; determining a clip internal parameter and a clip external parameter corresponding to the sample video clip; and training the content scoring model to be trained to obtain the content scoring model, based on the clip internal parameter and the clip external parameter.

In some alternative implementations of the present embodiment, the cover determination unit 505 is further configured to: determine, in the target video, a black-bordered video frame in which a video black border occurs; and determine the set of candidate video clips corresponding to the target video, based on other video frames in the target video excluding the black-bordered video frame and the preset video clip length.

In some alternative implementations of the present embodiment, the cover determination unit 505 is further configured to: determine, in the target video, a still video frame in which a still picture occurs; and determine the set of candidate video clips corresponding to the target video, based on other video frames in the target video excluding the still video frame and the preset video clip length.

It should be understood that the units 501 to 503 recorded in the apparatus 500 for processing a video correspond to the steps in the method described with reference to FIG. 2 respectively. Therefore, the operations and features described above for the method for processing a video are also applicable to the apparatus 500 and the units included therein, and detailed description thereof will be omitted.

According to an embodiment of the present disclosure, an embodiment of the present disclosure also provides an electronic device, a computer readable storage medium and a computer program product.

Figure 6:
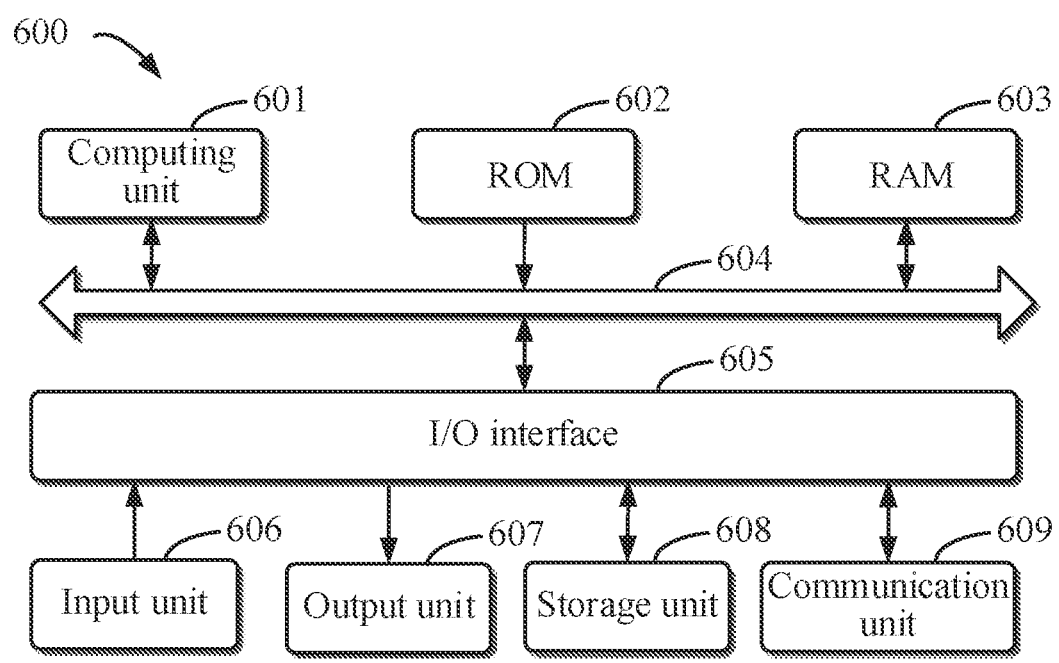
FIG. 6 is a block diagram of an electronic device used to implement the method for processing a video according to an embodiment of the present disclosure.

FIG. 6 shows a block diagram 600 of an electronic device used to implement the method for processing a video according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the device 600 includes a computing unit 601, which may perform various appropriate actions and processing, based on a computer program stored in a read-only memory (ROM) 602 or a computer program loaded from a storage unit 608 into a random access memory (RAM) 603. In the RAM 603, various programs and data required for the operation of the device 600 may also be stored. The computing unit 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The computing unit 601 may be various general-purpose and/or dedicated processing components having processing and computing capabilities. Some examples of the computing unit 601 include, but are not limited to, central processing unit (CPU), graphics processing unit (GPU), various dedicated artificial intelligence (AI) computing chips, various computing units running machine learning model algorithms, digital signal processor (DSP), and any appropriate computing units, controllers, microcontrollers, etc. The computing unit 601 performs the various methods and processes described above, such as the method for processing a video. For example, in some embodiments, the method for processing a video may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computing unit 601, one or more steps of the method for processing a video described above may be performed. Alternatively, in other embodiments, the computing unit 601 may be configured to perform the method for processing a video by any other appropriate means (for example, by means of firmware).

Various embodiments of the systems and technologies described herein may be implemented in digital electronic circuit systems, integrated circuit systems, field programmable gate array (FPGA), dedicated ASICs (application specific integrated circuits), special standard products (ASSP), system on a chip (SoC), load programmable logic device (CPLD), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The program code used to implement the methods disclosed herein may be written in any combination of one or more programming languages. Such program code may be provided to a computing unit or a controller of a general-purpose computer, a dedicated computer, or other programmable data processing device to enable the function/operation specified in the flow chart and/or block diagram to be performed when executed by the computing unit or the controller. The program code may be executed entirely on the machine, partially on the machine, partially on the machine as a stand-alone software package and partially on a remote machine, or completely on a remote machine or server.

In the context of the present disclosure, a machine-readable medium may be a tangible medium that may contain or store a program intended for use in or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices or equipment, or any appropriate combination of the foregoing. Machine readable storage medium of a more concrete examples would include an electrical connection based on one or more wires, portable computer disk, hard disk, random access memory (RAM), read-only memory (ROM), erasable and programmable read-only memory (EPROM, or flash memory), optical fiber, convenient type compact disk read only memory (CD-ROM), optical storage devices, magnetic storage device, or any appropriate combination of the foregoing.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing a video, the method comprising:
    acquiring a target video;
    selecting, from at least two preset models and according to a preset priority of each preset model, a preset model as a target model, the at least two preset models comprising a content scoring model and at least one of a face recognition model and a behavior recognition model;
    determining output data of the target model based on the target video and the target model, output data of the content scoring model being scores of video frames of the target video, output data of the face recognition model being a similarity between a face object in the target video and at least one preset face object, and output data of the behavior recognition model being a probability of behavior information in the target video including a designated motion;
    reselecting, in response to determining that the output data does not meet a condition corresponding to the target model, another preset model as the target model from the at least one preset model until the output data of the target model meets the condition corresponding to the target model, wherein a condition corresponding to the content scoring model is determining a highest score in the scores of video frames of the target video; and
    selecting at least one video frame in the target video based on the output data to form a video clip, and determining the video clip to be a dynamic cover.

2. The method for processing a video according to claim 1, wherein a preset model is selected as the target model through:
    determining an ordinal number of a current selection; and
    determining, from the at least one preset model, a preset model matching the ordinal number of the current selection in a preset model selection order as the target model.

3. The method for processing a video according to claim 1, wherein the target video comprises a title, and the title comprises a name; and
the method further comprises:
in response to determining that the similarity is less than a preset first threshold, or in response to determining that the similarity is greater than or equal to the first threshold but the face object in the target video does not match the name, determining that the output data does not meet the condition corresponding to the target model.

4. The method for processing a video according to claim 1, wherein the method further comprises:
determining, in response to determining that the probability is less than a preset second threshold, that the output data does not meet the condition corresponding to the target model.

5. The method for processing a video according to claim 1, wherein the determining output data of the target model based on the target video and the target model, comprises:
obtaining, for a plurality of video frames in the target video, content scores of the video frames based on the content scoring model.

6. The method for processing a video according to claim 5, wherein the obtaining, for the plurality of video frames in the target video, content scores of the video frames based on the content scoring model, comprises:
inputting the plurality of video frames in the target video into the content scoring model, so that the content scoring model determines feature information of the video frames, and determines a difference feature and a similar feature between the video frames based on the feature information of the video frames, and outputs the content scores of the video frames based on the difference feature and the similar feature.

7. The method for processing a video according to claim 1, wherein the determining the dynamic cover from the target video based on the output data, comprises:
determining, based on a preset video clip length, a set of candidate video clips corresponding to the target video; and
determining, based on the output data, the dynamic cover from the set of candidate video clips.

8. The method for processing a video according to claim 7, wherein the determining, based on the output data, the dynamic cover from the set of candidate video clips, comprises:
determining, based on the output data, a content score corresponding to each candidate video clip in the set of candidate video clips; and
determining the dynamic cover from the set of candidate video clips based on the content score corresponding to the each candidate video clip.

9. The method for processing a video according to claim 1, wherein the determining output data of the target model based on the target video and the target model, comprises:
extracting frames evenly from the target video to obtain a set of video frames; and
determining the output data of the target model based on the set of video frames and the target model.

10. The method for processing a video according to claim 5, wherein the content scoring model is obtained by training through:
acquiring a sample video;
inputting the sample video into a content scoring model to be trained, so that the content scoring model to be trained extracts feature information of video frames in the sample video, determines content scores of the video frames in the sample video based on the feature information, and determines a sample video clip based on the content scores of the video frames in the sample video;
determining a clip internal parameter and a clip external parameter corresponding to the sample video clip; and
training the content scoring model to be trained to obtain the content scoring model, based on the clip internal parameter and the clip external parameter.

11. The method for processing a video according to claim 7, wherein the determining, based on the preset video clip length, the set of candidate video clips corresponding to the target video, comprises:
determining, in the target video, a black-bordered video frame in which a video black border occurs; and
determining the set of candidate video clips corresponding to the target video, based on other video frames in the target video excluding the black-bordered video frame and the preset video clip length.

12. The method for processing a video according to claim 7, wherein the determining, based on the preset video clip length, the set of candidate video clips corresponding to the target video, comprises:
determining, in the target video, a still video frame in which a still picture occurs; and
determining the set of candidate video clips corresponding to the target video, based on other video frames in the target video excluding the still video frame and the preset video clip length.

13. An electronic device for processing a video, comprising:
one or more computing units; and
a storage unit, storing one or more programs thereon,
the one or more programs, when executed by the one or more computing units, cause the one or more computing units to implement operations, the operations comprising:
acquiring a target video;
selecting, from at least two preset models and according to a preset priority of each preset model, a preset model as a target model, the at least two preset models comprising a content scoring model and at least one of a face recognition model and a behavior recognition model;
determining output data of the target model based on the target video and the target model, output data of the content scoring model being scores of video frames of the target video, output data of the face recognition model being a similarity between a face object in the target video and at least one preset face object, and output data of the behavior recognition model being a probability of behavior information in the target video including a designated motion;
reselecting, in response to determining that the output data does not meet a condition corresponding to the target model, another preset model as the target model from the at least one preset model until the output data of the target model meets the condition corresponding to the target model, wherein a condition corresponding to the content scoring model is determining a highest score in the scores of video frames of the target video; and
selecting at least one video frame in the target video based on the output data to form a video clip, and determining the video clip to be a dynamic cover.

14. The electronic device according to claim 13, wherein a preset model is selected as the target model through:
   determining an ordinal number of a current selection; and
   determining, from the at least one preset model, a preset model matching the ordinal number of the current selection in a preset model selection order as the target model.

15. The electronic device according to claim 13, wherein the target video comprises a title, and the title comprises a name; and
   the operations further comprise:
   in response to determining that the similarity is less than a preset first threshold, or in response to determining that the similarity is greater than or equal to the first threshold but the face object in the target video does not match the name, determining that the output data does not meet the condition corresponding to the target model.

16. A non-transitory computer readable storage medium storing computer instructions, the computer instructions, when executed by a processor, cause the processor to perform operations, the operations comprising:
   acquiring a target video;
   selecting, from at least two preset models and according to a preset priority of each preset model, a preset model as a target model, the at least two preset models comprising a content scoring model and at least one of a face recognition model and a behavior recognition model;
   determining output data of the target model based on the target video and the target model, output data of the content scoring model being scores of video frames of the target video, output data of the face recognition model being a similarity between a face object in the target video and at least one preset face object, and output data of the behavior recognition model being a probability of behavior information in the target video including, a designated motion;
   reselecting, in response to determining that the output data does not meet a condition corresponding to the target model, another preset model as the target model from the at least one preset model until the output data of the target model meets the condition corresponding to the target model, wherein a condition corresponding to the content scoring model is determining a highest score in the scores of video frames of the target video; and
   selecting at least one video frame in the target video based on the output data to form a video clip, and determining the video clip to be a dynamic cover.

* * * * *